(12) United States Patent
Maffucci et al.

(10) Patent No.: US 10,527,097 B2
(45) Date of Patent: Jan. 7, 2020

(54) ROLLER BEARING AND A MECHANICAL SYSTEM COMPRISING SUCH A ROLLER BEARING

(71) Applicant: Aktiebolaget SKF, Gothenburg (SE)

(72) Inventors: Julien Maffucci, Pernay (FR); Vincent Hamar, Tours (FR); Harald Metz, Randersacker (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/911,721

(22) Filed: Mar. 5, 2018

(65) Prior Publication Data
US 2018/0258986 A1 Sep. 13, 2018

(30) Foreign Application Priority Data
Mar. 7, 2017 (DE) .................. 10 2017 203 698

(51) Int. Cl.
| | |
|---|---|
| F16C 19/46 | (2006.01) |
| F16C 17/04 | (2006.01) |
| F16C 19/36 | (2006.01) |
| F16C 33/46 | (2006.01) |
| F16C 21/00 | (2006.01) |
| F16C 33/58 | (2006.01) |

(52) U.S. Cl.
CPC .......... *F16C 33/4605* (2013.01); *F16C 17/04* (2013.01); *F16C 19/364* (2013.01); *F16C 19/463* (2013.01); *F16C 19/466* (2013.01); *F16C 21/005* (2013.01); *F16C 33/586* (2013.01)

(58) Field of Classification Search
CPC .. F16C 19/364; F16C 19/466; F16C 33/4605; F16C 33/581; F16C 21/005; F16C 17/04; F16C 19/463
See application file for complete search history.

(56) References Cited

U.S. PATENT DOCUMENTS

| | | | | |
|---|---|---|---|---|
| 3,384,426 A | * | 5/1968 | Schumacher, Jr. ...... | E21B 10/22 384/92 |
| 3,384,429 A | * | 5/1968 | Farrell ..................... | F16C 21/00 384/482 |
| 4,296,979 A | * | 10/1981 | Hofmann ............ | F04D 29/0462 384/453 |
| 7,992,533 B2 | * | 8/2011 | Vogel ...................... | B24B 19/12 123/90.6 |

(Continued)

FOREIGN PATENT DOCUMENTS

| | | |
|---|---|---|
| EP | 2423521 A1 | 2/2012 |
| EP | 2532847 A1 | 12/2012 |

(Continued)

*Primary Examiner* — Alan B Waits
(74) *Attorney, Agent, or Firm* — Garcia-Zamor Intellectual Property Law, LLC; Ruy Garcia-Zamor; Bryan Peckjian

(57) ABSTRACT

A roller bearing configured to be mounted on a balancing shaft. The rolling bearing having an outer ring, a cage axially protruding beyond at least one side of the outer ring, and rollers mounted in the cage and in rolling contact with the outer ring. The cage provides at least one boss on a side that axially protrudes beyond the outer ring, the boss being dedicated to come into abutment against the outer ring in case of relative axial displacement between the cage and outer ring.

9 Claims, 3 Drawing Sheets

(56) References Cited

U.S. PATENT DOCUMENTS

| | | | | |
|---|---|---|---|---|
| 8,568,038 B2* | 10/2013 | Lemaitre | | F01L 1/047 384/572 |
| 8,616,778 B2* | 12/2013 | Takahashi | | B22D 11/1287 384/476 |
| 9,322,430 B2* | 4/2016 | Schuler | | F16C 19/466 |
| 2006/0083449 A1* | 4/2006 | Laurant | | F16C 27/045 384/99 |
| 2010/0129023 A1* | 5/2010 | Lemaitre | | F01L 1/047 384/620 |
| 2011/0155089 A1* | 6/2011 | Mederer | | F16F 15/264 123/192.2 |
| 2013/0177270 A1* | 7/2013 | Ullman | | F16C 33/4694 384/576 |
| 2014/0274544 A1* | 9/2014 | Downs | | F16H 48/38 475/246 |
| 2015/0049975 A1* | 2/2015 | Lee | | F16C 33/58 384/569 |
| 2015/0152919 A1* | 6/2015 | Makke | | F16C 33/4605 384/569 |
| 2016/0025203 A1* | 1/2016 | Hoshina | | F16C 19/44 74/640 |
| 2016/0032971 A1* | 2/2016 | Giroud | | F16C 43/06 384/585 |
| 2016/0061258 A1* | 3/2016 | Kern | | F16C 33/4605 384/572 |
| 2016/0238066 A1* | 8/2016 | Corbett | | F16F 15/267 |
| 2016/0319869 A1* | 11/2016 | Watanabe | | F16C 19/466 |
| 2017/0122367 A1* | 5/2017 | Wilm | | F16C 41/04 |

FOREIGN PATENT DOCUMENTS

| | | | |
|---|---|---|---|
| EP | 3056751 A1 | | 8/2016 |
| FR | 25564285 | * | 6/1985 |
| JP | 2005172059 A | | 6/2005 |

* cited by examiner

ROLLER BEARING AND A MECHANICAL SYSTEM COMPRISING SUCH A ROLLER BEARING

CROSS-REFERENCE

This application claims priority to German patent application no. 102017203698.2 filed on Mar. 7, 2017, the contents of which are fully incorporated herein by reference.

TECHNOLOGICAL FIELD

The present invention concerns a roller bearing, adapted for mounting on a balancing shaft. The invention also concerns a mechanical system, for example a vehicle engine, comprising a balancing shaft and such a roller bearing.

BACKGROUND

U.S. Pat. No. 3,384,429 discloses an example of needle roller bearing, comprising an outer ring, a cage and needles mounted in pockets of the cage. The roller bearing also comprises thrust rings detachably secured on both sides of the outer ring. The roller bearing is mounted on a shaft, with the thrust rings disposed in bearing contact against a thrust collar and a shoulder of the shaft.

In practice, a relative axial displacement may occur between the cage and the outer ring and the shaft. It induces shocks and vibrations of cage, and increase friction torque between cage and thrust collar and should of the shaft.

It is known from DE-A1-10 2010 045875 to provide the needle roller bearing with a cage of width that is superior to the ring width, so as to strongly limit the relative axial displacement between the cage, the shaft and the outer ring.

However, the tolerances are very strict but contact may still occur between the cage and the abutting surfaces, increasing the friction torque of roller bearing.

SUMMARY

The aim of the invention is to provide an improved roller bearing without the aforementioned drawbacks, that is easy to manufacture and economical, easy to transport and to assemble.

To this end, the invention concerns a roller bearing, adapted for mounting on a balancing shaft and comprising an outer ring having a cylindrical inner surface centered on a central axis, and two annular lateral surfaces extending radially to the central axis and defining a ring width parallel to the central axis. The roller bearing further comprises a cage having a plurality of pockets circumferentially distributed around the central axis, and two annular lateral surfaces extending radially to the central axis and defining a cage width parallel to the central axis, the cage width being strictly superior to the ring width, the cage axially protruding beyond at least one of the annular lateral surfaces of the outer ring. The roller bearing also comprises rollers that are mounted in the pockets of the cage, extends parallel to the central axis, and are disposed in rolling contact with the inner surface of the outer ring.

According to the invention, the cage comprises at least one boss that radially outwardly protrudes from the cage on the side that axially protrudes beyond the outer ring, the boss being dedicated to come into abutment against the outer ring in case of relative axial displacement between the cage and outer ring.

A boss in the meaning of the invention is a portion of material that protrudes from a surface, the boss being discrete, e.g. extends circumferentially along a limited angular sector, preferably between 2° and 5°.

Thanks to the invention, the relative position between the outer ring and the cage provided with needles is maintained. The radial load capacity of the roller bearing is increased.

The cage protrudes axially on at least one side of the outer ring, preferably on both sides of the outer ring. The cage can be centered between radial parts belonging or being mounted on a shaft, reducing shocks and vibrations due to axial displacements of the cage. Thus, such a roller bearing mounted on a balancing shaft allows a reduction of friction, power losses, while providing a robust arrangement.

The additional weight of the at least one boss is negligible and ensures a cage of reduced weight.

The cage provided with rollers and the outer ring are prevented from relative axial displacement each other during transport, without additional temporary fixing means, requiring only one package for the assembly. Cage, needles and outer ring form an assembly that is delivered assembled together so as to be later mounted on a shaft during an easier assembly process.

According to further aspects of the invention which are advantageous but not compulsory, such a roller bearing may incorporate one or several of the following features:

The cage axially protrudes beyond both annular lateral surfaces of the outer ring.

The cage comprises at least one boss on each axial side, the bosses being dedicated to come into abutment against the outer ring in case of relative axial displacement between the cage and outer ring in both axial directions.

A plurality of bosses is circumferentially distributed on the circumference of at least one axial side of the cage.

The boss is of substantial half-spherical shape.

The rollers are of needle type.

The cage is made from polymer material.

The outer ring comprises an annular chamfer on at least one axial side, the chamfer being dedicated to form an abutting surface for at least one boss of cage.

The invention also concerns a mechanical system, for example a vehicle engine, comprising a balancing shaft having an axial part centered on a central axis and at least one radial part extending radially outwardly to the central axis. The mechanical system further comprises a second member secured to the balancing shaft. The mechanical system also comprises a roller bearing as defined hereabove, the outer ring being axially located between the radial part and the second member, the rollers being disposed in rolling contact with the axial part of the balancing shaft, the radial part and the second member forming axial guidance means for the cage disposed therebetween.

According to further aspects of the invention which are advantageous but not compulsory, such a mechanical system may incorporate one or several of the following features:

The outer ring is mounted in a housing.

An axial clearance is defined parallel to the central axis on at least one side of the cage, from a lateral surface of the cage up to a lateral surface of the radial part or of the second member.

Axial clearance is of higher width compared to the axial distance between a boss and the outer ring.

Axial clearances are defined on both sides of the cage.

The second member is a gear.

The second member and/or the radial part are/is an unbalanced part, for example a cam or a flying arm, which are/is formed eccentric relative to the central axis.

The balancing shaft is a crankshaft and the unbalanced part are flying arms supporting crankpins.

The axial part of shaft comprises an annular groove forming a rolling surface for the rollers, lateral edges of the groove forming axial guidance means for the rollers.

BRIEF DESCRIPTION OF THE DRAWINGS

The invention will now be explained in correspondence with the annexed figures, as an illustrative example, without restricting the object of the invention. In the annexed figures.

DETAILED DESCRIPTION

Figure 1:
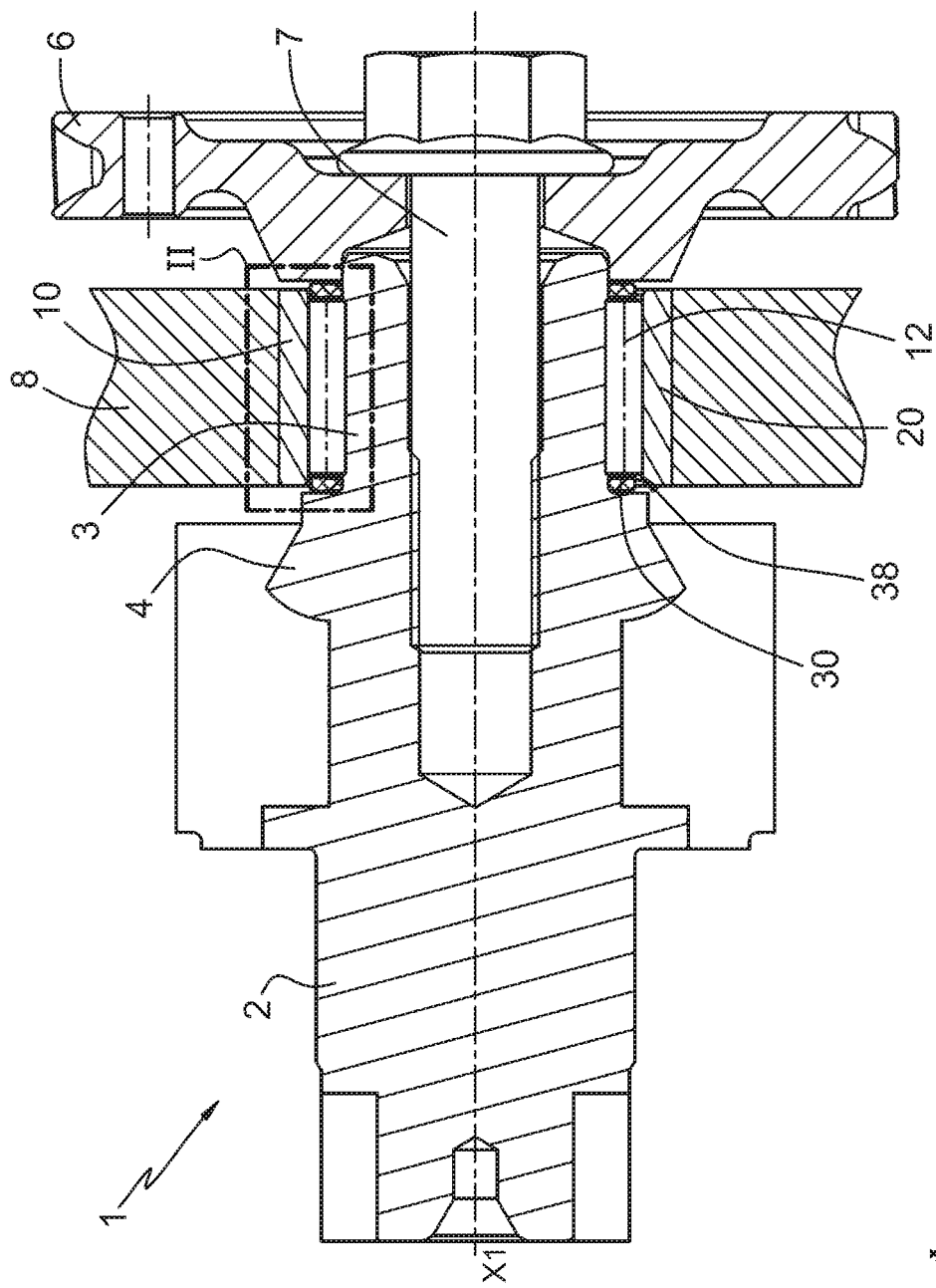
FIG. 1 is a sectional view of a mechanical system according to the invention, equipped with a roller bearing also according to the invention.
Figure 2:
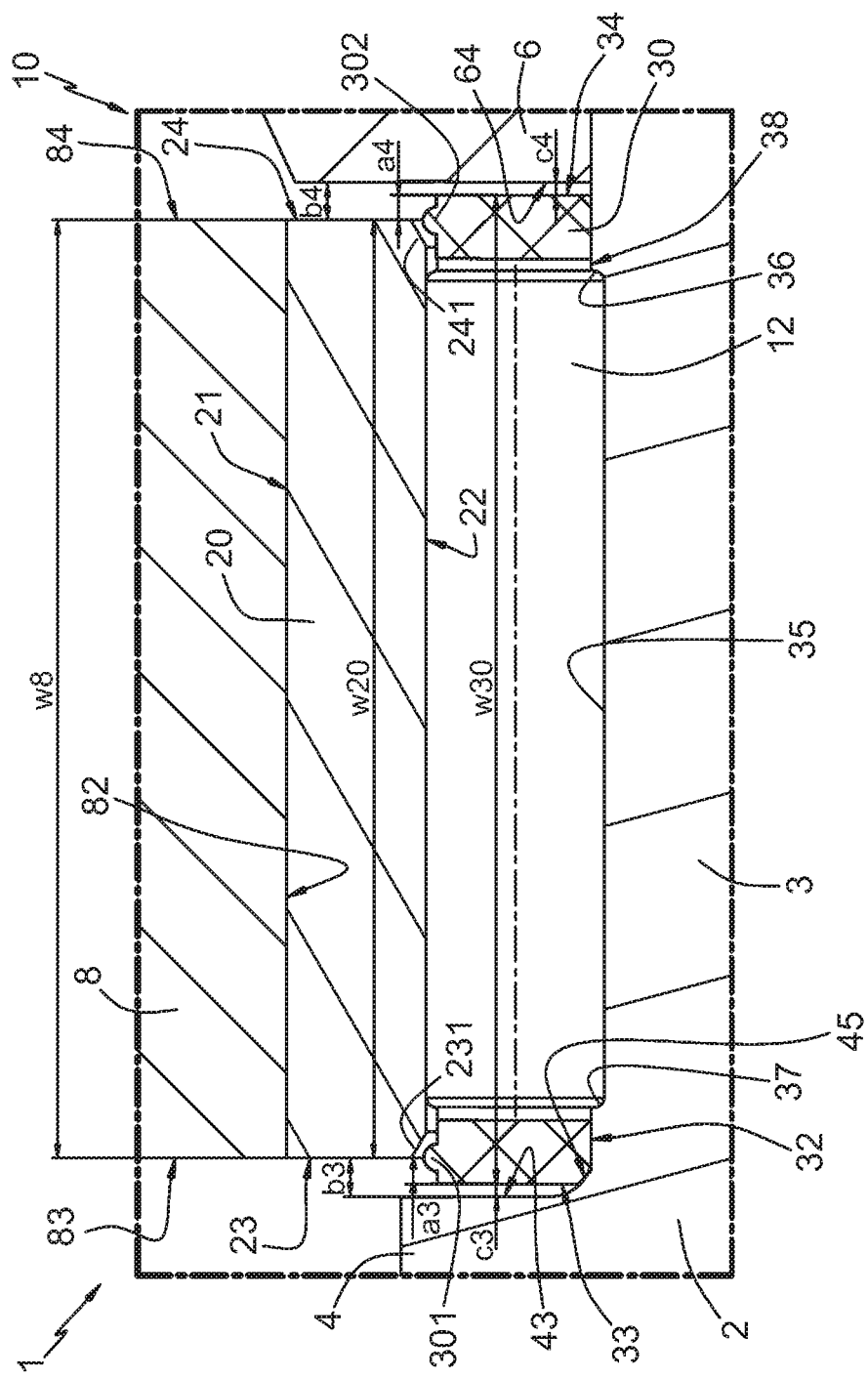
FIG. 2 is a sectional view, at a larger scale, showing detail II of FIG. 1.

FIGS. 1 and 2 partly show a mechanical system 1 according to the invention, for example a vehicle engine.

System 1 comprises a balancing shaft 2 including an axial part 3 and a radial part 4, a gear 6 secured to the shaft 2 by a screw 7, and a housing 8 axially located between radial part 4 and gear 6. In the present case, radial part 4 is a counterweight or unbalanced mass. A lateral surface 43 or radial part 4 and a lateral surface 64 of gear 6 are axially facing each other. Housing 8 comprises a cylindrical inner bore 82 and two lateral surfaces 83 and 84 defining a housing width w8.

Moreover, system 1 comprises a roller bearing 10 also defined according to the invention. Roller bearing 10 is mounted radially on axial part 3 of shaft 2 and in bore 82 of housing 8, and axially between surface 43 of radial part 4 and surface 64 of gear 6. Roller bearing 10 is centered on a central axis X10 and comprises rollers 12, an outer ring 20 and a cage 30. Rollers 12 are needles extending parallel to central axis X10. Part 4 and gear 6 form axial guidance means for roller bearing 1, in particular axial guidance means for cage 30 disposed therebetween.

As shown on FIG. 1, constitutive elements of system 1 are also centered on axis X10. In the concept of the invention, "axially" means parallel to axis X10, while "radially" means perpendicular to axis X10.

Outer ring 20 has a cylindrical outer surface 21 and a cylindrical inner surface 22 centered on axis X10. Surface 21 is fitted in bore 82 of housing 8, while surface 22 is in rolling contact with rollers 12. Outer ring 20 also has two annular lateral surfaces 23 and 24 extending radially to axis X10. Outer ring 20 has a ring width w20 defined parallel to axis X10 between the lateral surfaces 23 and 24.

Cage 30 is radially spaced from outer ring 20. Cage 30 is in contact with axial part 3 and with a corner 45 formed between part 3 and 4 of shaft 2. Cage has an inner surface 32 in contact with axial part 3. As an alternate not shown, the cage does not contact parts of the shaft 2.

Cage 30 has two annular lateral surfaces 33 and 34 extending radially to axis X10. Surface 33 faces surface 43 of radial part 4 of shaft 2, while surface 34 faces surface 64 of the gear 6. Part 4 and gear 6 form axial guidance means for cage 30 disposed therebetween. Cage 30 has a cage width w30 defined parallel to axis X10 between lateral surfaces 33 and 34.

Cage 30 comprises pockets 38 distributed around axis X10. Rollers 12 are mounted in pockets 38 and disposed in rolling contact, on the one hand, with inner surface 22 of outer ring 20 and, on the other hand, with axial part 3 of shaft 2.

More precisely, an outer cylindrical surface of the axial part 3 of shaft 2 comprises an annular groove 35 forming a rolling surface for the rollers 12 of bearing 10. Lateral edges 36, 37 on each axial side of the groove 35 are axial guiding means for the rollers 12. As an alternate not shown, the axial part 3 of shaft 2 comprises an outer cylindrical surface without groove, the cylindrical surface forming a rolling surface for the rollers 12. In that case, the lateral edges of pockets 38 of cage 30 form axial guidance means for the rollers 12.

As shown on FIGS. 1 and 2, widths w8 and w20 are substantially equal. Surface 23 of outer ring 20 is aligned with surface 83 of housing 8, while surface 24 of outer ring 20 is aligned with surface 84 of housing 8, radially to axis X10.

Parallel to axis X10, several distances a3, b3, c3 are defined on a first side of bearing 10 near surfaces 23, 33 and 43, while several distances a4, b4, c4 are defined on a second side of bearing 10 near surfaces 24, 34 and 64. An axial overstepping a3 is defined from surfaces 23 up to surface 33. An axial clearance b3 is defined from surface 23 up to surface 43. An axial clearance c3 is defined from surface 24 up to surface 34. An axial overstepping a4 is defined from surface 24 up to surface 34. An axial clearance b4 is defined from surface 24 up to surface 64. An axial clearance c4 is defined from surface 34 up to surface 64.

In other words, cage 30 protrudes axially beyond at least one lateral surface 23 or 24 of outer ring 20 and beyond corresponding lateral surface 83 or 84 of housing 8. Preferably, as shown on FIGS. 1 and 2, cage 30 protrudes beyond both lateral surfaces 23 and 24 of outer ring 20 and beyond both lateral surfaces 83 and 84 of housing 8.

According to the invention, the cage 30 comprises a first boss 301 on a first axial side, the first boss 301 radially outwardly protruding from the cage 30 and being dedicated to come into abutment against the lateral surface 23 of outer ring 20 in case of relative axial displacement between the cage 30 and outer ring 20.

In the embodiment of FIG. 2, the cage 30 further a second boss 302 on a second axial side, the second boss 302 radially outwardly protruding from the cage 30 and being dedicated to come into abutment against the lateral surface 24 of outer ring 20 in case of relative axial displacement between the cage 30 and outer ring 20.

Bosses 301, 302 are discrete, e.g. circumferentially extend along a limited angular sector, preferably between 2° and 5°.

Bosses 301, 302 radially extend beyond the inner cylindrical bore 22 of outer ring 20. Bosses 301, 302 partly axially face the lateral surfaces 23, 24 respectively of outer ring 20, the surfaces 23, 24 forming abutment surfaces for the bosses 301, 302.

In the embodiment of FIG. 2, lateral surfaces 23, 24 of outer ring 20 comprise each a chamfer 231, 241 respectively. By this way, the axial arrangement of the roller bearing 10 is of reduced width and can be implemented in reduced widths between radial part 4 and gear 6. In this embodiment, chamfers 231, 241 define each a slope surface but may have any other suitable shape. As an alternate not shown, the lateral surfaces 23, 24 of outer ring do not comprise any chamfer, bosses abutting directly against lateral surfaces.

As an alternate not shown, only one side of the cage may comprise at least one boss.

Figure 3:
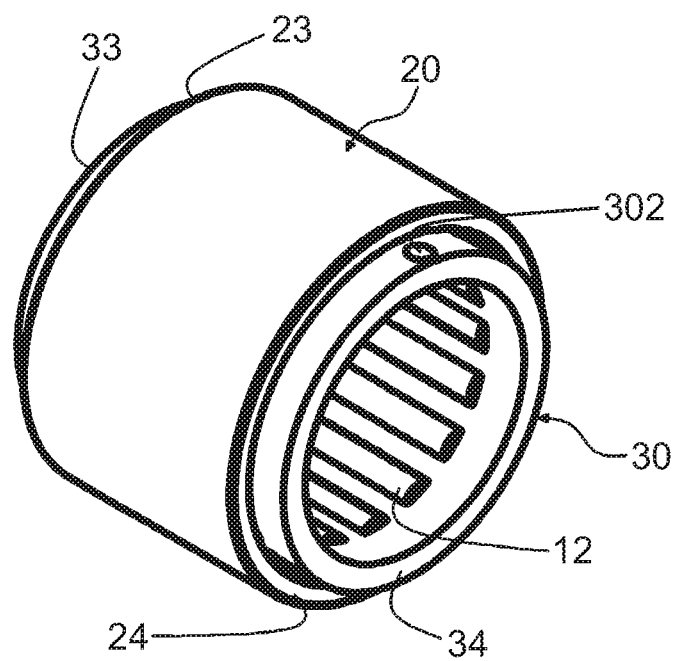
FIG. 3 is a perspective view of a roller bearing according to the invention.

In the embodiment of FIG. 3, the cage 30 comprises only one boss on each axial side. As an alternate not shown, a plurality of bosses can be circumferentially distributed on the circumference of at least one axial side of the cage 30.

In the embodiment of FIGS. 2 and 3, the bosses are of substantial half-spherical shape. Alternatively, bosses may have any other suitable shape protruding from the cage 30.

Advantageously, axial clearances c3 and c4 are each of higher width compared to the axial distance between each boss 301, 302 and the contact surface with outer ring 20, here the chamfers 231, 241 respectively. Such a design rule prevents the lateral surfaces 33, 34 of cage 30 to contact the lateral surfaces 43, 64 of radial part 4 and gear, respectively.

The cage is centered between part 4 of shaft 2 and gear 6, thus reducing the shocks and vibrations due to axial cage displacements. In operation or during transport, the axial movement of cage 30 is stopped either by boss 301 against the chamfer 231 on one side of outer ring 20 or by boss 302 against the chamfer 241 on the other side of outer ring 20.

Other non-shown embodiments can be implemented within the scope of the invention. In particular, shaft 2, housing 8 and roller bearing 10 can have different shapes or arrangements to be adapted to the specific requirements of the application, still within the scope of the invention.

What is claimed is:

1. A combination of a roller bearing and a balancing shaft on which the roller bearing is mounted comprising:
   an outer ring having a cylindrical inner surface centered on a central axis, and two annular lateral outer ring surfaces extending radially toward the central axis and defining a ring width parallel to the central axis,
   a cage having a plurality of pockets circumferentially distributed around the central axis, and two annular lateral cage surfaces extending radially to the central axis and defining a cage width parallel to the central axis, the cage width being greater than the ring width, the cage axially protruding beyond at least one of the annular lateral surfaces of the outer ring, and
   rollers that are mounted in the pockets of the cage, extend parallel to the central axis, and are disposed between the inner surface of the outer ring and a circumferential groove extending axially along the balancing shaft such that all of the contact between the rollers and the balancing shaft is located in the circumferential groove and such that all contact between the cage and the balancing shaft is located outside of the circumferential groove, the circumferential groove being configured to maintain an elongated axis of each of the rollers parallel to the central axis, wherein contact between the cage and the balancing shaft is at a different radial distance from the contact between the rollers and the balancing shaft, the cage comprises:
   at least one boss that radially outwardly protrudes from an axially extending radial surface on a side of the cage that axially protrudes beyond the outer ring, the boss being dedicated to come into abutment against the outer ring in case of relative axial displacement between the cage and outer ring, the axially extending radial surface having a first axial end and a second axial end, the at least one boss being axially spaced from the first axial end and from the second axial end, and
   wherein the outer ring comprises an annular chamfer on at least on axial side, the chamfer being dedicated to form an abutting surface for at least one boss of the cage.

2. The roller bearing according to claim 1, wherein the cage axially protrudes beyond both annular lateral outer ring surfaces of the outer ring.

3. The roller bearing according to claim 2, wherein the cage comprises at least one boss on each axial side, the bosses being dedicated to come into abutment against the outer ring in case of relative axial displacement between the cage and outer ring in both axial directions.

4. A mechanical system for a vehicle engine, comprising:
   a balancing shaft having an axial part centered on a central axis and at least one radial part extending radially outwardly to the central axis,
   a second member secured to the balancing shaft, and
   a roller bearing according to claim 1, the outer ring being axially located between the radial part and the second member, the rollers being disposed in rolling contact with the axial part of the balancing shaft, the radial part and the second member forming axial guidance means for the cage disposed therebetween.

5. The mechanical system according to claim 4, wherein the outer ring is mounted in a housing.

6. The mechanical system according to claim 4, wherein an axial clearance is defined parallel to the central axis on at least one side of the cage from a lateral surface of the cage up to a lateral surface of the radial part or of the second member, the axial clearance providing a greater width compared to the axial distance between the boss and the outer ring.

7. The mechanical system according to claim 6, wherein axial clearances are defined on both sides of the cage.

8. The mechanical system according to claim 4, wherein the second member is a gear.

9. The mechanical system according to claim 4, wherein lateral edges of the circumferential groove form axial guidance means for the rollers.

* * * * *